United States Patent
Palu et al.

(10) Patent No.: US 10,254,069 B2
(45) Date of Patent: Apr. 9, 2019

(54) BIPOD FOR FIREARM

(71) Applicant: Thunder Beast Arms Corporation, Cheyenne, WY (US)

(72) Inventors: Kurtis A. Palu, Wellington, CO (US); Michael S. Coppinger, Cheyenne, WY (US)

(73) Assignee: Thunder Beast Arms Corporation, Cheyenne, WY (US)

( * ) Notice: Subject to any disclaimer, the term of this patent is extended or adjusted under 35 U.S.C. 154(b) by 0 days.

(21) Appl. No.: 15/918,968

(22) Filed: Mar. 12, 2018

(65) Prior Publication Data
US 2018/0259287 A1 Sep. 13, 2018

Related U.S. Application Data

(60) Provisional application No. 62/470,708, filed on Mar. 13, 2017.

(51) Int. Cl.
*F41A 23/10* (2006.01)
*F16M 11/26* (2006.01)

(52) U.S. Cl.
CPC ............. *F41A 23/10* (2013.01); *F16M 11/26* (2013.01)

(58) Field of Classification Search
CPC .......... F41A 23/02; F41A 23/04; F41A 23/08; F41A 23/10; F16M 11/24; F16M 11/26; F16M 11/242
USPC ...................... 42/94; 89/37.03, 37.04; 73/167
See application file for complete search history.

(56) References Cited

U.S. PATENT DOCUMENTS

| | | | |
|---|---|---|---|
| 1,331,116 A | * | 2/1920 | Messersmith ........... F41A 27/06 89/40.06 |
| 2,436,349 A | | 2/1948 | Adams |
| 3,327,422 A | | 6/1967 | Harris |
| 4,265,045 A | | 5/1981 | Garbini |
| 4,351,224 A | | 9/1982 | Curtis |
| 4,607,561 A | | 8/1986 | Frimer |
| 4,625,620 A | | 12/1986 | Harris |
| 4,641,451 A | | 2/1987 | Harris |
| 4,776,124 A | | 10/1988 | Clifton |
| 4,903,425 A | | 2/1990 | Harris |
| 5,029,407 A | | 7/1991 | Kirkpatrick |
| 5,074,188 A | | 12/1991 | Harris |
| 5,194,678 A | | 3/1993 | Kramer |
| 5,507,111 A | | 4/1996 | Stinson et al. |

(Continued)

FOREIGN PATENT DOCUMENTS

WO WO-2010/080785 A2 7/2010

*Primary Examiner* — John Cooper
(74) *Attorney, Agent, or Firm* — Adsero IP

(57) ABSTRACT

A bipod for a firearm is provided that improves efficiency and ease of reconfiguration of the bipod while providing stable support for the firearm. In various embodiments, a bipod for a firearm might comprise a main body that can mount to the firearm, two legs, two plates, a first actuator mounted to each leg, and a second actuator mounted to each of two side mounts. Each leg might comprise a head portion and a main leg which extends from the head portion. Each plate might rotatably couple each leg to one of the side mounts. The first actuator, when actuated, releases a leg to rotate relative to its plate by a first angle. The second actuator, when actuated, releases the plate to rotate with respect to the main body by a second angle, independent of any rotation of the corresponding leg relative to the plate effected by the first actuator.

17 Claims, 8 Drawing Sheets

(56) References Cited

U.S. PATENT DOCUMENTS

| | | | |
|---|---|---|---|
| 5,711,103 A | 1/1998 | Keng | |
| 5,815,974 A | 10/1998 | Keng | |
| 5,852,892 A | 12/1998 | Bilgeri et al. | |
| 5,937,560 A | 8/1999 | Beltz | |
| 6,663,071 B2 | 12/2003 | Peterson | |
| 6,763,627 B1 | 7/2004 | Kaempe | |
| 6,843,015 B2 | 1/2005 | Sharp | |
| 7,032,494 B2 | 4/2006 | Wygant | |
| 7,143,986 B1 | 12/2006 | Austin et al. | |
| 7,222,451 B2 | 5/2007 | Keng et al. | |
| 7,431,247 B2 | 10/2008 | Bobro | |
| 7,478,496 B2 | 1/2009 | Bender | |
| 7,614,174 B1 | 11/2009 | Beltz | |
| 7,631,455 B2 | 12/2009 | Keng et al. | |
| 7,676,977 B1 * | 3/2010 | Cahill | F16M 11/16 248/168 |
| 7,779,572 B2 | 8/2010 | Potterfield et al. | |
| 7,793,454 B1 | 9/2010 | Beltz | |
| 7,841,122 B1 | 11/2010 | Hansen et al. | |
| 7,954,272 B2 | 6/2011 | Potterfield et al. | |
| 8,104,213 B2 | 1/2012 | Keng et al. | |
| 8,291,633 B1 | 10/2012 | Hass et al. | |
| 8,316,570 B2 | 11/2012 | Potterfield et al. | |
| 8,327,570 B2 | 12/2012 | Potterfield et al. | |
| 8,402,684 B1 * | 3/2013 | Beltz | F41A 23/10 42/72 |
| 8,448,369 B2 | 5/2013 | Hinds, Jr. | |
| 8,458,946 B1 | 6/2013 | Pintsch | |
| 8,464,628 B2 | 6/2013 | Potterfield et al. | |
| 8,496,212 B2 | 7/2013 | Keng et al. | |
| 8,707,604 B2 | 4/2014 | Troy et al. | |
| 8,863,430 B2 * | 10/2014 | Poling | F41A 23/08 248/163.1 |
| 8,904,693 B1 | 12/2014 | Beltz | |
| 9,903,528 B1 * | 2/2018 | Hatch | F16M 11/26 |
| 10,012,465 B1 * | 7/2018 | Liechty | F41A 23/10 |
| 2005/0188597 A1 | 9/2005 | Keng et al. | |
| 2005/0242250 A1 | 11/2005 | Keng et al. | |
| 2009/0000175 A1 | 1/2009 | Potterfield et al. | |
| 2009/0126250 A1 | 5/2009 | Keng | |
| 2010/0218411 A1 | 9/2010 | Keng | |
| 2011/0036236 A1 | 2/2011 | Potterfield et al. | |
| 2012/0085012 A1 | 4/2012 | Potterfield et al. | |
| 2012/0186126 A1 | 7/2012 | Bartak | |
| 2013/0036647 A1 | 2/2013 | Chvala | |
| 2014/0115940 A1 | 5/2014 | Bonelli et al. | |
| 2016/0209172 A1 * | 7/2016 | Trotabas | F41G 1/44 |
| 2016/0265864 A1 * | 9/2016 | Poling | F41A 23/10 |
| 2017/0205180 A1 * | 7/2017 | Ding | F41A 23/02 |
| 2018/0202746 A1 * | 7/2018 | Flood, Jr. | F41A 23/10 |

* cited by examiner

BIPOD FOR FIREARM

CROSS REFERENCE TO RELATED APPLICATIONS

This application claims priority to U.S. Patent Application Ser. No. 62/470,708, filed Mar. 13, 2017 by Kurtis A. Palu et al. and titled, "Bipod for Firearm", which is hereby incorporated by reference in its entirety for all purposes.

This application may be related to the following applications (collectively, the "Related Applications"), each of which is incorporated by reference in its entirety for all purposes: provisional U.S. Patent Application No. 62/510,868 filed May 25, 2017 by Kurtis A. Palu et al. and titled, "Noise Suppressor for Firearm and Blank Firing Adapter for Firearm"; U.S. patent application Ser. No. 15/483,648, filed Apr. 10, 2017 by Kurtis A. Palu and titled, "Noise Suppressor for Firearm", which claims the benefit of provisional U.S. Patent Application No. 62/322,063 filed Apr. 13, 2016 by Kurtis A. Palu and titled, "Noise Suppressor for Firearm"; U.S. patent application Ser. No. 15/404,837, filed Jan. 12, 2017 by Kurtis A. Palu et al. and titled, "Noise Suppressor for Firearm", which claims the benefit of provisional U.S. Patent Application No. 62/278,270, filed Jan. 13, 2016 by Kurtis A. Palu et al. and titled, "Noise Suppressor for Firearm"; U.S. patent application Ser. No. 15/281,323, filed Sep. 30, 2016 by Kurtis Allen Palu and titled "Locking Mechanism for Suppressor Mount", which claims the benefit of provisional U.S. Patent Application No. 62/236,487, filed Oct. 2, 2015 by Kurtis Allen Palu and titled, "Suppressor Mount"; U.S. patent application Ser. No. 14/816,321 filed Aug. 3, 2015 by Kurtis A. Palu et al. and titled, "Noise Suppressor for Firearm"; U.S. patent application Ser. No. 14/987,984 (now U.S. Pat. No. 9,459,065), filed Jan. 5, 2016 by Kurtis A. Palu and titled, "Flash Suppressor for Firearm", which is a divisional application of U.S. patent application Ser. No. 14/465,060 (now U.S. Pat. No. 9,261,319) filed Aug. 21, 2014 by Kurtis A. Palu and titled, "Flash Suppressor for Firearm"; U.S. patent application Ser. No. 14/615,826 (now U.S. Pat. No. 9,366,495) filed Feb. 6, 2015 by Michael S. Coppinger et al. and titled, "Noise Suppressor for Firearm"; and U.S. patent application Ser. No. 14/640,791 filed Mar. 6, 2015 by Michael S. Coppinger et al. and titled, "Noise Suppressor for Firearm", which claims the benefit of provisional U.S. Patent Application No. 61/949,670 filed Mar. 7, 2014 by Michael Shane Coppinger et al. and titled, "Sound Suppressor with Longitudinal Baffle".

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a bipod design for a firearm, and more particularly, to a bipod design for a firearm that provides for quick and efficient configuration of the bipod while providing stable support for the firearm and limiting excessive weight of the bipod.

BACKGROUND

In order to effectively fire a projectile over long distances, a bipod is used to ensure stability of the firearm. Traditional or conventional bipods for firearms, however, are based on designs that are focused on stability, but ignore speed or efficiency in configuring the bipod for firing the projectile or for collapsing the bipod during movement (which involves carrying the firearm). A number of these traditional or conventional bipods, in fact, require two hands to adjust or (re)configure the bipods to set up a shot or to set the firearm (with the bipod) for movement. Such traditional or conventional bipods are thus ill-suited for situations or activities that require speed and mobility (such as during firearm competitions or during live engagement with an enemy force, etc.).

Recent developments in the design of bipods have improved the efficiency (e.g., in terms of single-handed use) in configuring the bipod for use or for mobility, but such bipods still require time to configure the bipod, and in some cases may be difficult to configure while the user is in a prone position with the butt stock of the firearm pressed against his or her shoulder.

Accordingly, there is a need for a bipod design for a firearm that further improves efficiency and ease of (re) configuration of the bipod while providing stable support for the firearm and limiting excessive weight of the bipod.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Overview

Figure 1:
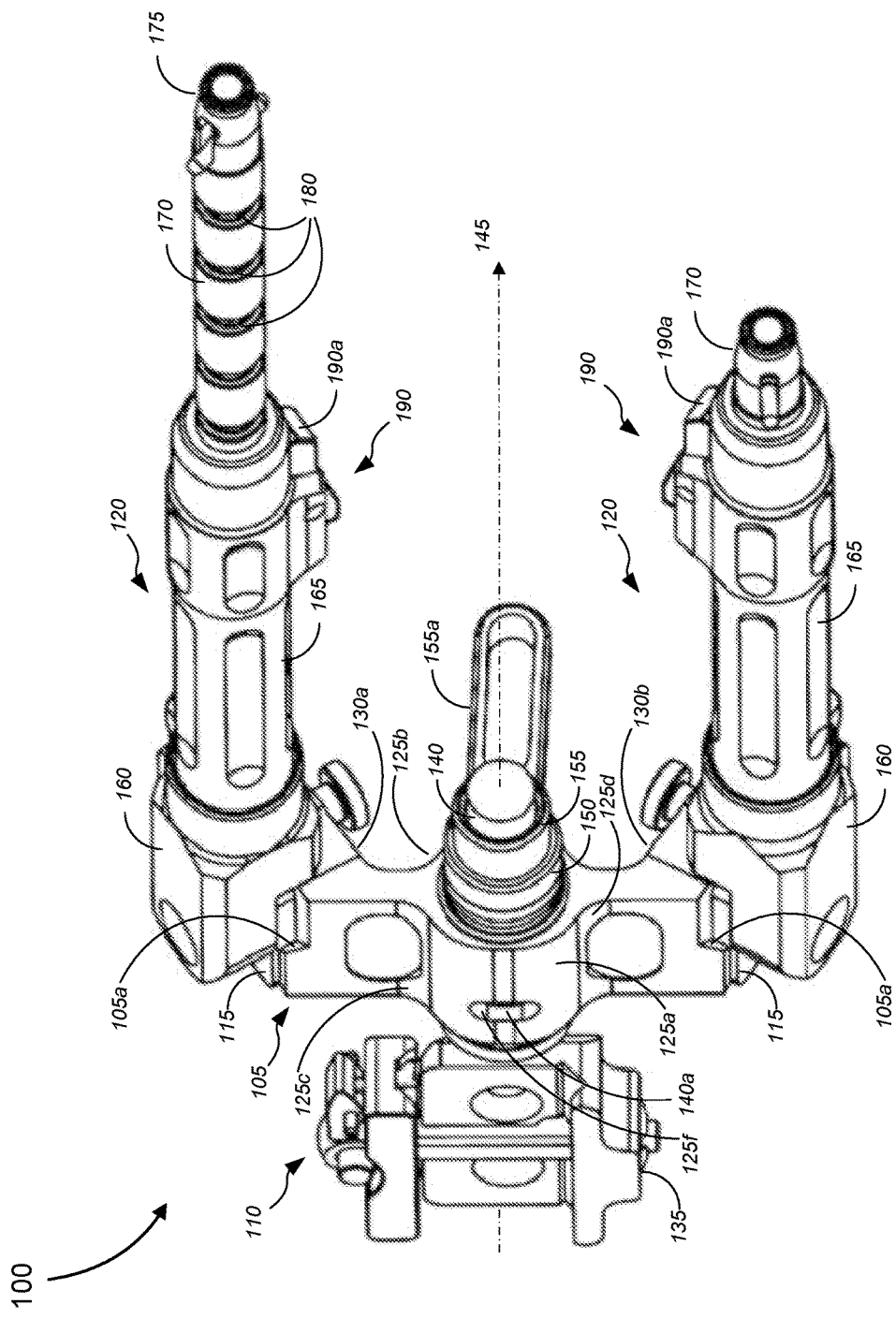
FIG. 1 shows a top perspective view of a bipod that is an embodiment of the present invention, the bipod being shown in a carry mode.

Various embodiments provide for a bipod for a firearm that further improves efficiency and ease of configuration or reconfiguration of the bipod while providing stable support for the firearm and limiting excessive weight of the bipod.

In various embodiments, a bipod for a firearm might comprise a main body, a pair of legs, a pair of plates, a first actuator mounted to each leg, and a second actuator mounted to each side mount of a pair of side mounts of the main body. The main body might further comprise the pair of side mounts and a mounting connector that removably affixes to one of a fore stock or handguard of a firearm via a mount. Each of the pair of legs might comprise a head portion and a main leg, the head portion being coupled to or formed from a proximal end of the main leg. Each of the pair of plates might rotatably couple each of the pair of legs to one of the pair of side mounts of the main body. The first actuator, when actuated, releases the corresponding leg to rotate with respect to the corresponding plate by a first angle. The second actuator, when actuated, releases the corresponding plate to rotate with respect to the main body by a second angle, independent of any rotation of the corresponding leg relative to the corresponding plate effected by the first actuator.

The various actuators and levers—i.e., the first actuator that allows each leg to be rotated by the first predetermined angle (e.g., 90 degrees or the like) with respect to the corresponding plate; the second actuator that allows each plate to be rotated by the second predetermined angle (e.g., 45 degrees or the like with respect to the corresponding side mount or main body, independent of any rotation of the corresponding leg with respect to said plate; etc.—are designed to be actuated by a user with the use of a single hand of the user (in some cases, while the user is in a prone position with one hand on the grip).

These and other features of the bipod are described in detail below with respect to the figures, which depict non-limiting embodiments of the invention.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a bipod for a firearm might comprise a yoke, a firearm mount, a pair of legs, a pair of plates, a first actuator mounted to each leg, and a second actuator mounted to each side mount of a pair of side mounts of the yoke. The yoke might comprise a main body, a cylindrical cavity through a space within the main body, and the pair of side mounts. The main body might have a top surface, a bottom surface, and two sides, the two sides each having a side portion that lies along a side plane that is orthogonal to and intersects with each of a top plane along which a topmost portion of the top surface lies and a bottom plane along with a bottommost portion of the bottom surface lies, the top plane being parallel with the bottom plane. A perimeter of the space might be defined by connection of the top surface and the bottom surface by the two sides, the cylindrical cavity having a central axis, wherein the central axis does not intersect with any of the top plane, the bottom plane, or the side planes. Each of the side mounts might extend laterally from a corresponding one of the two sides of the main body, the pair of side mounts each having a mounting surface that is angled with respect to the corresponding one of the two sides such that the mounting surface lies along a plane that intersects with a corresponding side plane, but does not intersect with the central axis of the cylindrical cavity.

The firearm mount might comprise a cylinder or an axle that couples to the yoke through the cylindrical cavity, wherein the firearm mount, when the bipod is mounted on a firearm, is removably affixed to one of a fore stock or a handguard of the firearm via a mount, the central axis of the cylindrical cavity aligning with a central axis of the cylinder of the firearm mount and with a central axis of the mount when the firearm mount is coupled to the yoke and mounted within the mount. Each of the pair of legs might comprise a head portion, a main leg, an inner leg, a leg spring, and a leg lever. The head portion might be coupled to or formed from a proximal end of the main leg. The inner leg might be fitted within a cylindrical cavity formed within the main leg, wherein the leg spring is disposed within an innermost portion of the cylindrical cavity near the proximal end of the main leg and maintains a repelling force between the cylindrical cavity of the main leg and a proximal end of the inner leg. The inner leg might have a plurality of ring grooves formed along a circumference of the inner leg at predetermined intervals along a length of the inner leg. The leg lever might be mounted on the main leg near a distal end thereof with a latch that fits within each of the plurality of ring grooves. The latch, when the leg lever is actuated, moves away from a first ring groove of the plurality of ring grooves to fit within a second ring groove of the plurality of ring grooves when a spring of the leg lever causes the latch to move back toward the inner leg and when the leg spring causes the inner leg to move along the cylindrical cavity relative to the main leg.

Each of the pair of plates might comprise a first connector that connects to one of the pair of side mounts of the yoke and a second connector that connects to the head portion of one of the pair of legs. The first actuator, when actuated, releases the corresponding leg to rotate with respect to the corresponding plate by a first angle. The second actuator, when actuated, releases the corresponding plate to which the second actuator contacts to rotate with respect to the main body by a second angle, independent of any rotation of the corresponding leg that is in contact with the corresponding plate relative to the corresponding plate effected by the first actuator.

In some embodiments, the first angle is 90 degrees. In some cases, each plate might further comprise a first groove, a second groove, and a curved side surface between the first groove and the second groove. The first actuator might comprise a latch that fits within the first groove and that, when the first actuator is actuated, moves out of the first groove to travel along the curved side surface to fit within the second groove. In some instances, each first actuator might comprise a first actuator spring having a spring constant that prevents the first actuator from being actuated due to the weight of the firearm, while allowing a user to actuate the first actuator by applying a force against the leg on which the first actuator is mounted.

According to some embodiments, the second angle is 45 degrees. In some instances, each plate might further comprise a third groove, a fourth groove, and a track groove between the third groove and the fourth groove. The third groove, the fourth groove, and the track groove might be disposed within a middle portion of the plate and extend through a thickness of the plate. Each second actuator might comprise a shaft and an end portion extending from the shaft, wherein the end portion fits within the third groove and, when the second actuator is actuated, moves in a first direction parallel to the thickness of the plate out of the third groove to allow the shaft to move along the track groove to the fourth groove, with the end portion moving in a second direction opposite to the first direction to fit within the fourth groove.

Merely by way of example, in some embodiments, the bipod might further comprise a tension-setting device comprising a third connector and a collar with a handle. The third connector might be removably affixed to the main body of the yoke. The collar might wrap around the circumference of a distal end of the cylinder of the firearm mount. Rotating the collar in a third direction by twisting the handle about the central axis of the cylinder in the third direction causes the cylinder of the firearm mount to press closer to the main body of the yoke thereby increasing resistance to rotation of the cylinder with respect to the main body. Conversely, rotating the collar in a fourth direction opposite to the third direction by twisting the handle about the central axis of the cylinder in the fourth direction causes the cylinder of the firearm mount to loosen contact with the main body of the yoke thereby decreasing resistance to rotation of the cylinder with respect to the main body. According to some embodiments, the main body might comprise a through-hole groove on one of the top surface or the bottom surface of the main body. The cylinder might comprise a threaded hole, wherein, when a threaded end of a rod engages the threaded hole in the cylinder through the through-hole groove in the main body and when the collar is rotated in the fourth direction, the cylinder is free to rotate with respect to the main body about the central axis by a first range of angles that is delimited by a length of the through-hole groove.

In some embodiments, the firearm mount might comprise one of a spigot-based firearm mount or a picatinny rail-based firearm mount, and/or the like.

In another aspect, a bipod for a firearm might comprise a main body, a pair of legs, a pair of plates, a first actuator mounted to each leg, and a second actuator mounted to each side mount of a pair of side mounts of the main body. The main body might comprise the pair of side mounts and a mounting connector that removably affixes to one of a fore stock or handguard of a firearm via a mount. Each of the pair of legs might comprise a head portion and a main leg, the head portion being coupled to or formed from a proximal end of the main leg. Each of the pair of plates might rotatably couple each of the pair of legs to one of the pair of side mounts of the main body. The first actuator, when actuated, releases the corresponding leg to rotate with respect to the corresponding plate by a first angle. The second actuator, when actuated, releases the corresponding plate to rotate with respect to the main body by a second angle, independent of any rotation of the corresponding leg relative to the corresponding plate effected by the first actuator.

In some embodiments, the first angle is 90 degrees. In some cases, each plate might further comprise a first groove, a second groove, and a curved side surface between the first groove and the second groove. The first actuator might comprise a latch that fits within the first groove and that, when the first actuator is actuated, moves out of the first groove to travel along the curved side surface to fit within the second groove. In some embodiments, each of the first groove and the second groove might have a curved edge adjacent to the curved side surface that facilitates movement of the latch out of the corresponding groove. In some instances, each first actuator might comprise a first actuator spring having a spring constant that prevents the first actuator from being actuated due to the weight of the firearm, while allowing a user to actuate the first actuator by applying a force against the leg on which the first actuator is mounted.

According to some embodiments, the second angle is 45 degrees. In some instances, each plate might further comprise a third groove, a fourth groove, and a track groove between the third groove and the fourth groove. The third groove, the fourth groove, and the track groove might be disposed within a middle portion of the plate and extend through a thickness of the plate. Each second actuator might comprise a shaft and an end portion extending from the shaft, wherein the end portion fits within the third groove and, when the second actuator is actuated, moves in a first direction parallel to the thickness of the plate out of the third groove to allow the shaft to move along the track groove to the fourth groove, with the end portion moving in a second direction opposite to the first direction to fit within the fourth groove.

Merely by way of example, in some embodiments, each leg might comprise a spring-loaded telescoping inner leg, a plurality of circumferential grooves, and a hand-actuated detente device comprising one or more contacts that engage with one of the plurality of circumferential grooves at a time.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of a bipod for a firearm that further improves efficiency and ease of configuration or reconfiguration of the bipod while providing stable support for the firearm and limiting excessive weight of the bipod, as referred to above. The apparatuses or systems illustrated by FIGS. 1-8, in some cases, may refer to examples of different embodiments that include various components, which can be considered alternatives or which can be used in conjunction with one another in the various embodiments. The description of the illustrated apparatuses or systems shown in FIGS. 1-8 is provided for purposes of illustration and should not be considered to limit the scope of the different embodiments.

With reference to FIG. 1, bipod 100 according to various embodiments of the present invention comprises a yoke 105, a firearm mount 110, a pair of plates 115, and a pair of legs 120. The yoke 105 might comprise a main body 125 having a top surface 125a, a bottom surface 125b, sides 125c and 125d, a cylindrical cavity 125e, and (in some cases) a through-hole groove 125f. The yoke 105 might further comprise a pair of side mounts 130a and 130b each extending laterally from a corresponding one of two sides of the main body 125 (i.e., extending laterally from a corresponding one of the two sides 125c and 125d). In some embodiments, the topmost portion of the top surface 125a might lie within a top plane, while the bottommost portion of the bottom surface 125b might lie within a bottom plane, the top plane being parallel with the bottom plane. In some cases, the sides 125c and 125d might each comprise a side portion that lies along a side plane that is orthogonal to and intersects with each of the top plane and the bottom plane. The side mounts 130a and 130b, according to some embodiments, might each comprise a mounting surface that is angled with respect to the corresponding one of the two sides 125c and 125d such that the mounting surface lies along a plane that intersects with a corresponding side plane. As shown in FIG. 1, for example, the yoke 105 might have side portions extending laterally from a central portion (i.e., main body 125), with side mounts attached to ends of the side portions while end portions of the side mounts angle downward and to the side. In some cases, the mounting surfaces might be angled at an angle between 100 and 135 degrees with respect to the top plane (or an angle of about 10 and 45 degrees with respect to the bottom plane).

In some embodiments, cylindrical cavity 125e might be formed through a space within the main body, a perimeter of the space being defined by connection of the top surface and the bottom surface by each of the two sides 125c and 125d. The cylindrical cavity having a central axis that is parallel and aligned with axis 145 in FIG. 1. The central axis does not intersect with any of the top plane, the bottom plane, the side planes, or the plane along which each of the mounting surfaces lie.

The firearm mount 110 might comprise a connector 135 and a cylinder or axle 140. The connector 135—which might include, but is not limited to, one of a spigot-based firearm mount (not shown) or a picatinny rail-based firearm mount (shown, e.g., in FIGS. 1-8, or the like), and/or the like—might removably connect with a mount—including, without limitation, a spigot-based mount or a picatinny rail, and/or the like, respectively (not shown)—that is removably affixed to one of a fore stock or handguard of a firearm. In other words, the connector 135 might, when the bipod is mounted on the firearm (not shown), removably affix to one of the fore stock or the handguard of the firearm via the mount. The central axis of the cylindrical cavity 125e might align with a central axis of the cylinder 140 of the firearm mount 110 and with a central axis of the mount when the firearm mount 110 is coupled to the yoke 105 and mounted within the mount, each of the central axes being aligned and parallel with the axis 145 of FIG. 1.

According to some embodiments, the cylinder 140 of the firearm mount 110 might extend through the cylindrical cavity 125e of the main body 125 of the yoke 105. At the distal end of the cylindrical cavity 125e that is opposite to proximal end of the cylindrical cavity 125e that is adjacent to the connector 135, when the firearm mount 110 is coupled with the yoke 105, a connector 150 might removably couple with the main body 125 via the distal end (in some cases, via a threaded connection or the like). A collar 155 with a handle 155a (or at least a finger grip or the like) might couple to the connector 150. The connector 150 and collar 155 might serve as a tension-setting device that applies a tension (i.e., force) on the cylinder 140 (which might, in some cases, a circumferential groove or notch, or the like, with which the collar 155 might engage or lock), along the axial direction 145 when the handle 155a is rotated about the axis 145 in a first direction. Such tensile force causes a surface of the connector 135 to press against or make greater contact with a surface of the proximal end of the cylindrical cavity 125e, thereby increasing the resistance to rotation of the cylinder 140 with respect to the main body 125 of the yoke 105. In some cases, contact materials having medium to high frictional coefficient might be used at the contact surfaces (i.e., at the surface of the connector 135 and at the surface of the proximal end of the cylindrical cavity 125e) to facilitate such resistance to rotation of the cylinder 140.

When the collar 155 (or the handle 155a is rotated about the axis 145 in a second direction that is opposite to the first direction, the tensile force is relieved such that the surface of the connector 135 loosens contact with the surface of the proximal end of the cylindrical cavity 125e, thereby decreasing the resistance to rotation of the cylinder 140 with respect to the main body 125 of the yoke 105, thus allowing more freedom of rotation of the cylinder 140 (with respect to the main body 125 of yoke 105) about the axis 145. In some embodiments, the cylinder 140 might comprise a threaded hole 140a, which might align along the axial direction 145 with the through-hole groove 125f (which might be disposed on the top surface 125a (as shown in FIG. 1) or on the bottom surface 125b (not shown)).

In situations when the collar 155 is rotated in the second direction (i.e., with the cylinder 140 free to rotate with respect to the main body 125 about the axis 145), when a threaded end of a rod, bolt, or thumb screw, etc. engages with the threaded hole 140a in the cylinder 140 through the through-hole groove 125f, the cylinder 140 remains free to rotate with respect to the main body 125 about the axis 145, but is delimited by a length of the through-hole groove 125f along a direction perpendicular to axis 145 (along a plane that is parallel to one of the top or bottom planes) to a first range of angles (e.g., between about 10 and 45 degrees, or the like). The tension-setting device provides the user with options to stiffen the rotation of the firearm with respect to the bipod 100 to lock the firearm in one position (e.g., upright, tilted by a desired degree to the left to facilitate viewing through a rifle scope by a right-handed shooter, or tilted by a desired degree to the right to facilitate viewing through the rifle scope by a left-handed shooter, to account for placement of the bipod on a slope, etc.). For users who prefer freedom of rotation of the firearm with respect to the bipod, the tension-setting device (when loosened) provides greater flexibility. The rod, bolt, or thumb screw, etc., in combination with the threaded hole 140a and the through-hole groove 125f, provides for freedom of rotation of the firearm with respect to the bipod within a set range of angles (as defined by the length of the through-hole groove 125f), which provides the user with freedom of rotation while preventing the firearm from rotating too far and potentially falling over.

Figure 7:
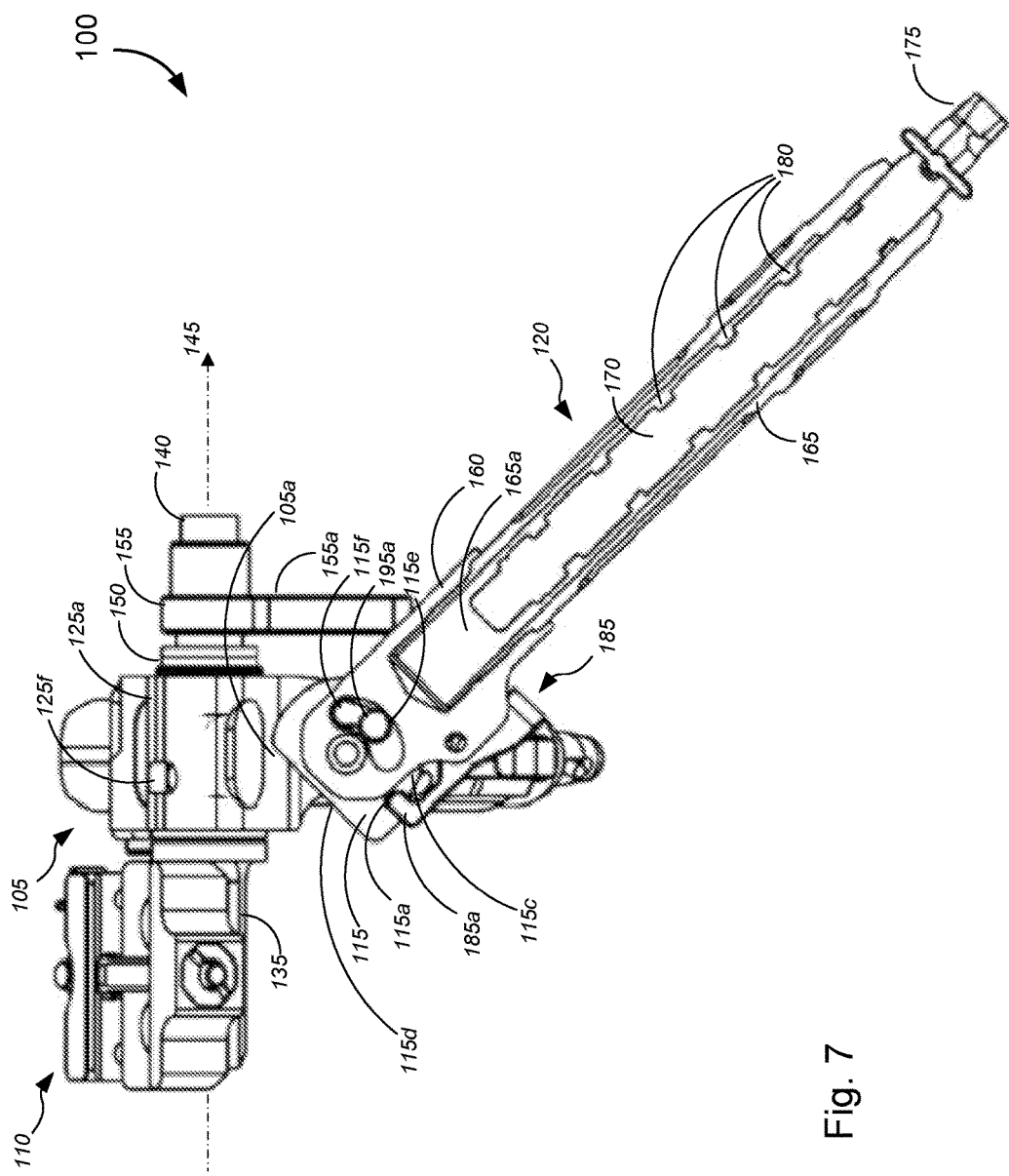
FIG. 7 shows a partial cutout view of the bipod of FIG. 6.

Referring back to FIG. 1, the pair of legs 120 might each comprise a head portion 160, a main leg 165, and an inner leg 170. The head portion 160 might be either coupled to or formed from a proximal end of the main leg 165. The inner leg 170 might telescopically fit within a cylindrical cavity that extends along a longitudinal direction within the main leg 165 (as shown in FIGS. 4 and 7, for example). The inner leg 170 might include a plurality of ring grooves 180 or a plurality of circumferential grooves 180 that are formed at predetermined intervals along the length of the inner leg 170 (as shown, e.g., in FIGS. 1, 2, 4, and 7). In some cases, the inner legs 170 might each comprise a distal end 175 including, but not limited to, one of a threaded distal end that may be coupled with a counter-threaded foot (not shown) or a J-lock-based distal end that may be coupled with a J-lock quick connect foot, or the like. In some embodiments, a leg spring (not shown) might be disposed within a spring cavity 165a of the main leg 165 (as shown, e.g., in FIGS. 4 and 7). The leg spring might apply a force that pushes the inner leg 170 away from the spring cavity 165a (or the head portion 160), with the inner leg 170 being held in place by a latch 190a of the leg actuator 190. When actuated by a user, the latch 190a might move out of a first of the ring grooves or circumferential grooves 180, which allows the leg spring to push inner leg 170 telescopically downward out of the cylindrical cavity of the main leg 165 to fit into a second of the ring grooves or circumferential grooves 180. If the user holds down on the lever of the leg actuator 190, the leg spring might cause the inner leg 170 to skip one or more grooves 180, until the proximal end of the inner leg 170 contacts the narrower opening of the main leg 165, and the latch 190a (when the user releases the lever) eventually locks into the innermost groove 180. In some embodiments, the leg spring might be selected so as to have a spring constant that is sufficient to apply a spring force that is greater than a force of gravity due to the weight of the firearm (and its accessories). In other words, when in a firearm mount mode (as shown in FIG. 3), the user should be able to depress the lever and the leg spring should be able to push the inner leg 170 downward while pushing the head portion 160 and/or the main leg 165 upward despite the weight of the firearm (and its accessories), thereby lifting the firearm (and its accessories). To lower the bipod, the user might apply force or at least a portion of his or her weight down on the barrel, fore stock, or hand guard of the firearm, thereby pressing down on the main body 125 of the yoke 105 (and thus the head portion 160 or the main leg 165), which would compress the leg spring when the lever is depressed, thus allowing the firearm to lower as the bipod legs are lowered (i.e., as the inner leg 170 retracts within the main leg 165).

Figure 2:
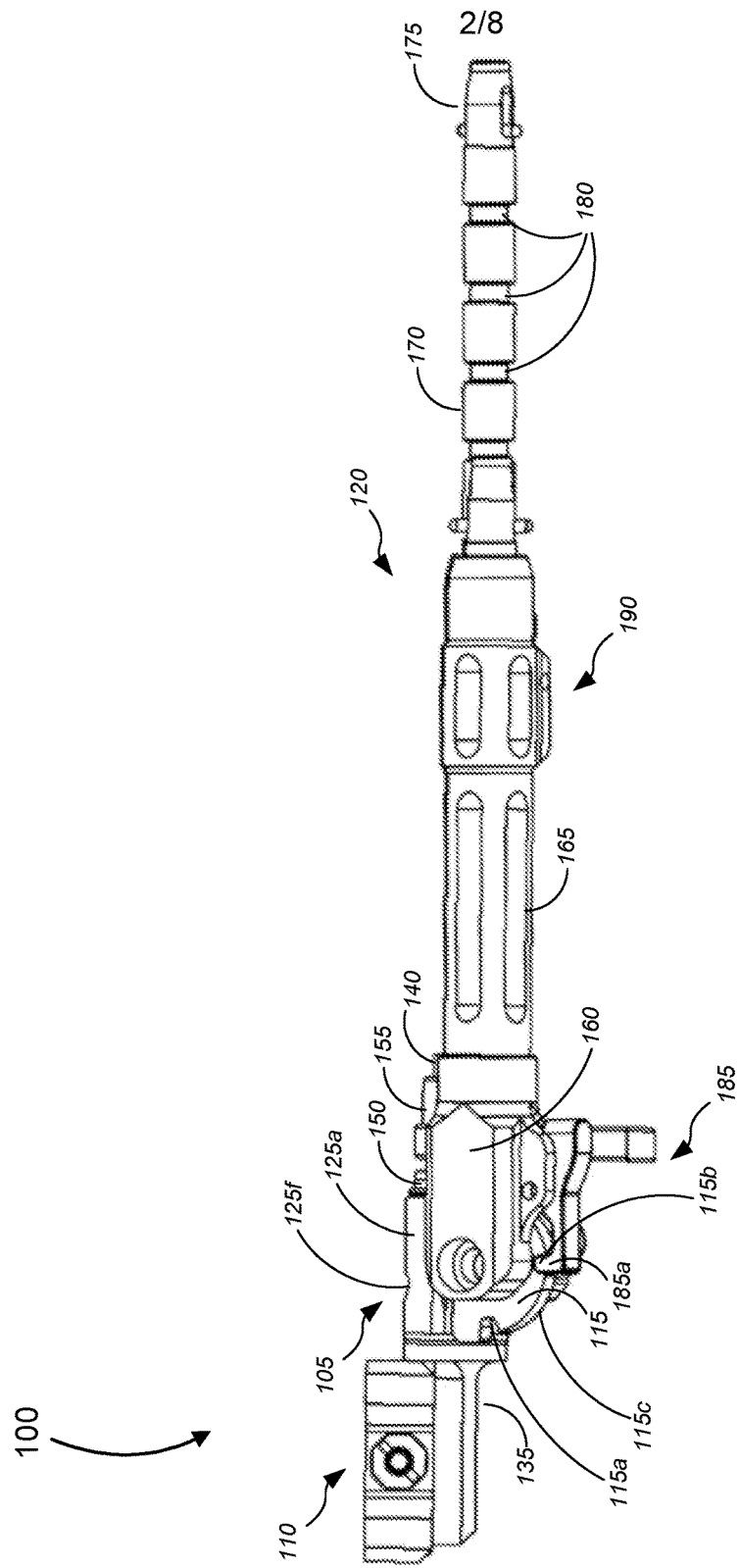
FIG. 2 shows a side elevation view of the bipod of FIG. 1.
Figure 3:
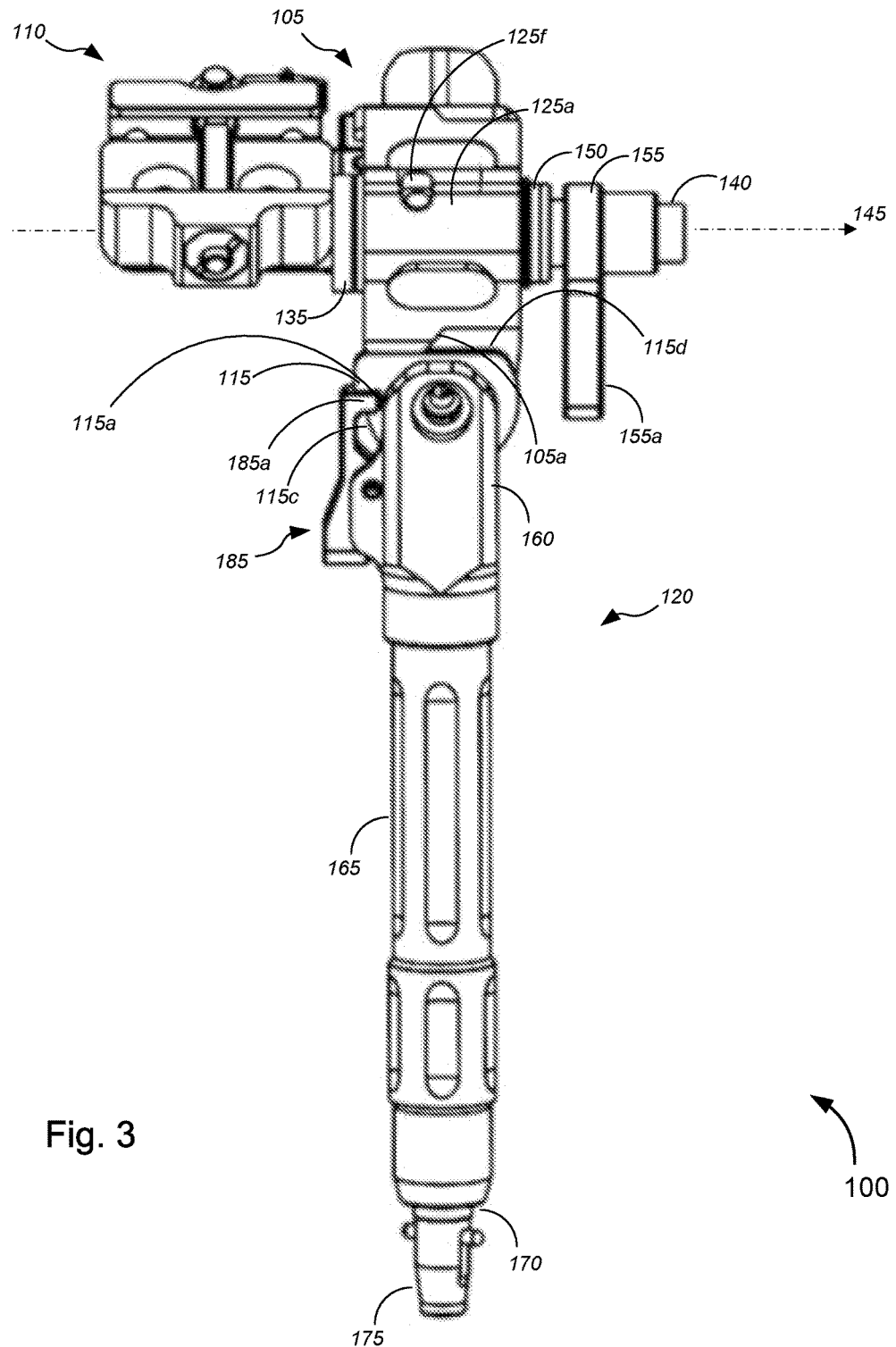
FIG. 3 shows a side perspective view of the bipod of FIG. 1, when the bipod is in a firearm mount mode.
Figure 4:
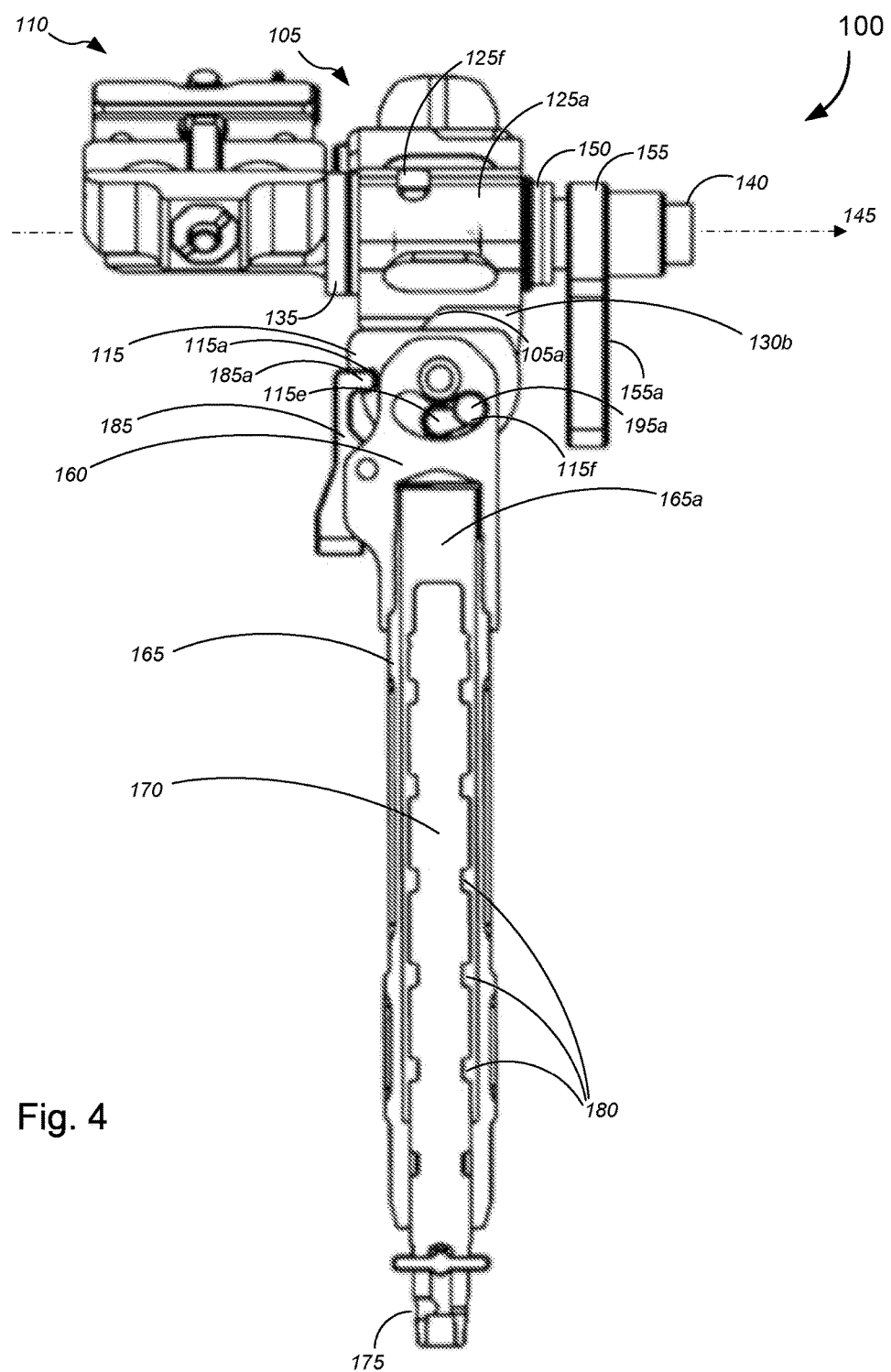
FIG. 4 shows a partial cutout view of the bipod of FIG. 3 as shown at a different perspective view angle.
Figure 5:
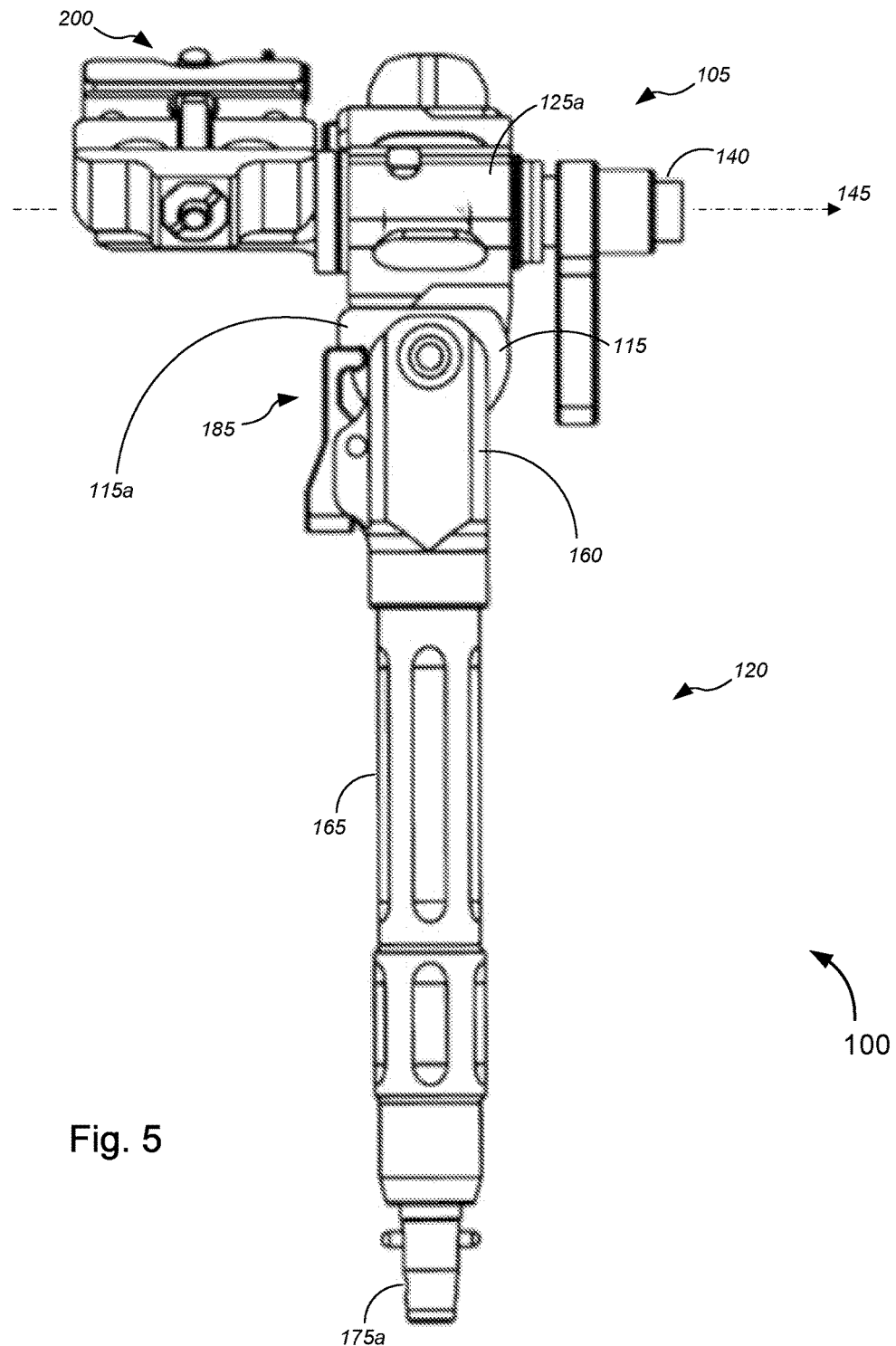
FIG. 5 shows a side perspective view of the bipod of FIG. 4.
Figure 6:
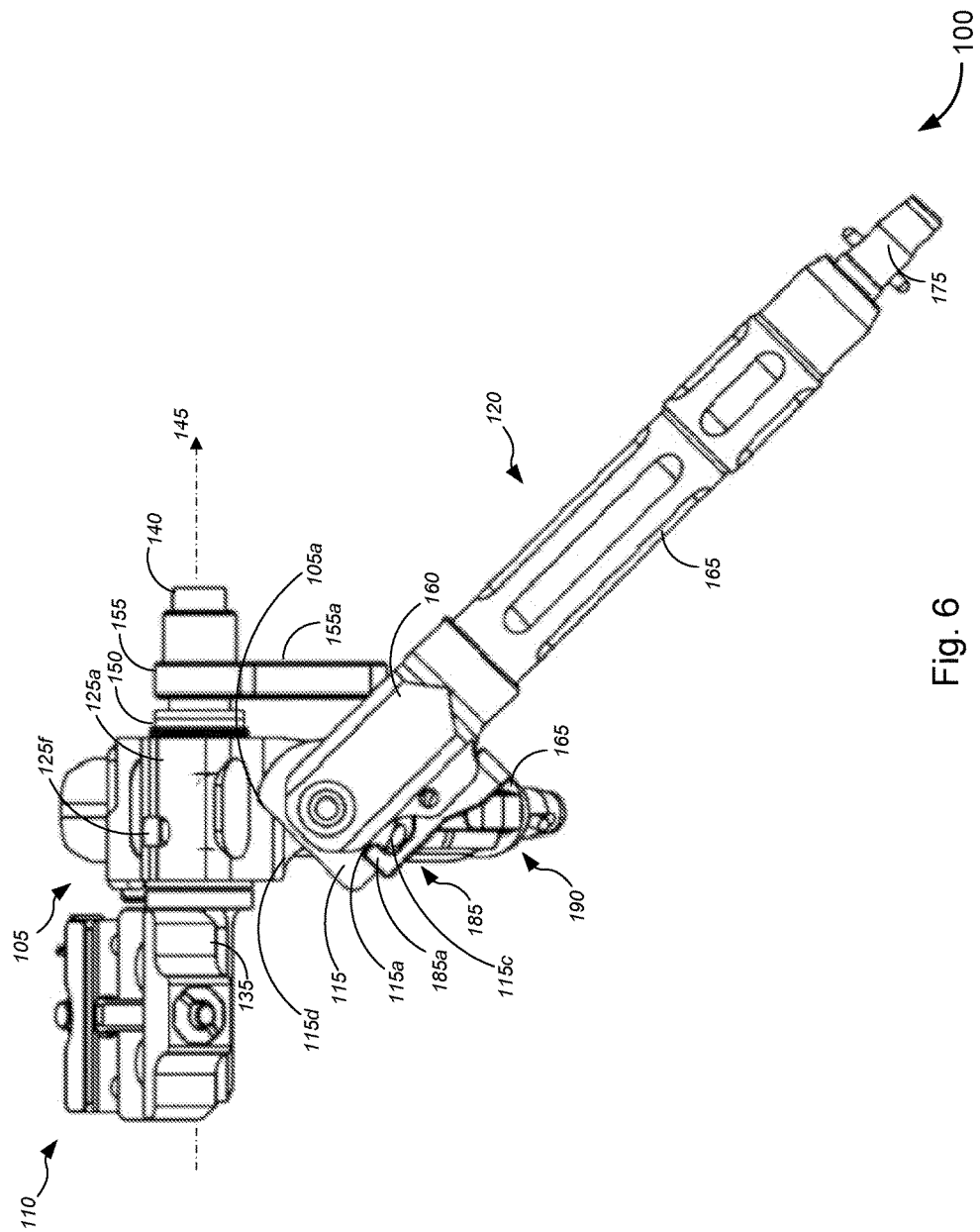
FIG. 6 shows a side perspective view of the bipod of FIG. 1, when the bipod is in a firearm mount mode, with the right leg being set at 45 degrees relative to a side mount of the main body of the bipod.

With reference to FIGS. 2 and 3, each plate 115 might comprise a first groove 115a, a second groove 115b, and a curved side surface 115c that extends between the first groove 115a and the second groove 115b. The bipod 100 might further comprise a first actuator 185 that comprises a latch 185a that fits in or engages each of the grooves 115a and 115b in turn. For instance, when the first actuator is actuated, the latch moves out of one of the grooves 115a or 115b to travel along the curved side surface 115c to fit within the other of the grooves 115b or 115a, thereby causing the legs (which are attached to the plates 115) to rotate with respect to the plates 115 by a first predetermined angle (e.g., 90 degrees or the like). In other words, to change the bipod's configuration from a carry mode (as shown in FIG. 2) to a firearm mount mode (as shown in FIG. 3), a user might actuate the first actuator 185, which might move the latch 185a out of the second groove 115b so that the latch can travel along the curved side surface 115c to fit within the first groove 115a. Similarly, to change the bipod's configuration from the firearm mount mode (as shown in FIG. 3) to the carry mode (as shown in FIG. 2), the user might actuate the first actuator 185, which might move the latch 185a out of the first groove 115a so that the latch can travel along the curved side surface 115c to fit within the second groove 115b.

Merely by way of example, in some embodiments, each of the first groove 115a and the second groove 115b might have a curved edge adjacent to the curved side surface 115c that facilitates movement of the latch out of the corresponding groove 115a or 115b. According to some embodiments, the first actuator 185 might comprise a first actuator spring (not shown) having a spring constant that prevents the first actuator from being actuated due to the weight of the firearm (with its accessories, including, but not limited to, ammunition, sniper scope, bayonet, a suppressor as described in detail in any of the Related Applications (which have already been incorporated herein by reference in their entirety), etc.), while allowing the user to actuate the first actuator by applying a force against the leg 120 on which the first actuator 185 is mounted. In other words, the user might push down (with force) on the legs 120 to change the bipod from the carry mode (as shown in FIG. 2) to the firearm mount mode (as shown in FIG. 3), where the force applied supersedes the spring force in the first actuator 185, thereby causing the latch 185 to move out of the second groove 115b (in some cases, facilitated by the curved edge in the second groove 115b adjacent to the curved side surface 115c). The continued motion of the user's hand or arm might cause the legs 120 to continue its movement such that the latch 185a travels along the curved side surface 115c to fit within the first groove 115a. Similarly, the user might push up (with force) on the legs 120 in a sweeping manner to change the firearm mount mode (as shown in FIG. 3) to the carry mode (as shown in FIG. 2), where the force applied supersedes the spring force in the first actuator 185, thereby causing the latch 185 to move out of the first groove 115a (in some cases, facilitated by the curved edge in the first groove 115a adjacent to the curved side surface 115c). The continued motion of the user's hand or arm might cause the legs 120 to continue its movement such that the latch 185a travels along the curved side surface 115c to fit within the second groove 115b.

In either situation, the spring force of the first actuator 185, however, is sufficient to keep the legs 120 of the bipod 100 in the set mode (i.e., in one of the carry mode (as shown in FIG. 2) to the firearm mount mode (as shown in FIG. 3)), despite the weight of the firearm (and its accessories) applying a force (due to gravity) on the first actuator spring. Such configuration allows for quick and easy reconfiguration of the bipod 100, which is important in time sensitive situations such as firearms competitions or armed military engagements with enemy forces, or the like.

Figure 8:
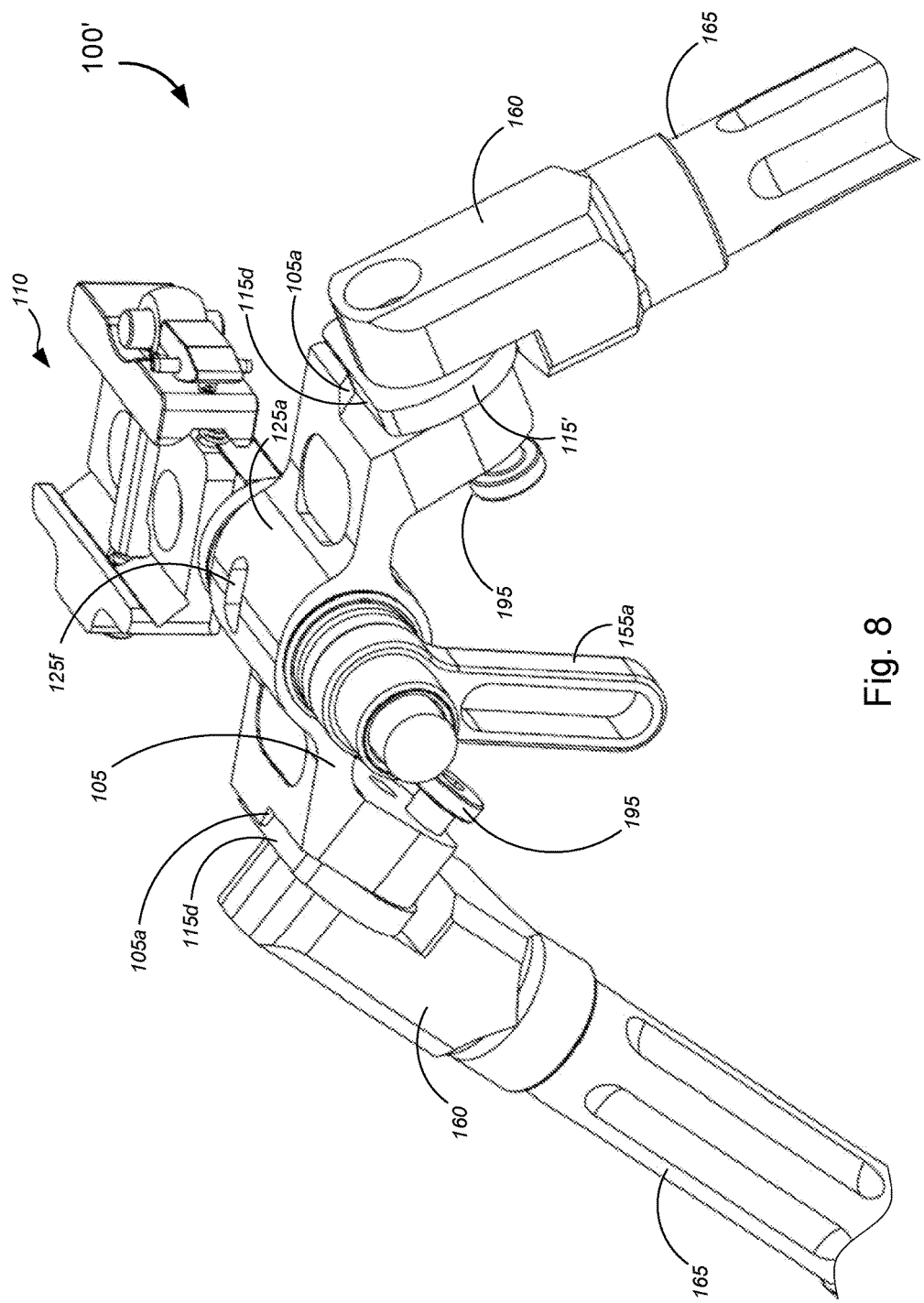
FIG. 8 shows a front elevation (partial sectional) view of another embodiment of the bipod of FIG. 1, when the bipod is in a firearm mount mode.

Another feature of the bipod 100 is the use of a second actuator 195 that allows the plates 115 to rotate with respect to the side mounts 130a and 130b by a second predetermined angle (e.g., 45 degrees or the like), independent of the rotation of the legs 120 with respect to the plates 115 by the first predetermined angle (e.g., 90 degrees or the like). With reference to FIGS. 4, 7, and 8, each plate 115 might further comprise a third groove 115e, a fourth groove 115f, and a track groove between the third groove 115e and the fourth groove 115f. A groove might also be formed within the head portion 160 of the leg 120. In some embodiments, when a user depresses the second actuator 195 (which might be embodied, in some cases, as a button 195 or the like, although not limited to such) in a third direction (which is parallel to a thickness of the plate 115), a shaft of the second actuator 195 moves through the side mount 130 and through one of the third or fourth grooves 115e or 115f, such that an end portion 195a (which fits within each of the third and fourth grooves 115e and 115f in turn) moves in the third direction of the button depression out of the one of the third or fourth grooves 115e or 115f. The end portion 195a (which now resides within the groove in the head portion 160) is free to move along the groove in the head portion 160 while the shaft is free to move along the track groove in the plate 115, until the end portion 195a enters the other one of the third or fourth grooves 115e or 115f. When the second actuator 195 is released (in some cases, via spring action or the like), while the end portion 195a is in the other one of the third or fourth grooves 115e or 115f, the shaft moves in a fourth direction opposite to the third direction, thereby causing the end portion 195a to fit within the other one of the third or fourth grooves 115e or 115f.

For example, when the user would like to lower the firearm lower than the lowest setting of the legs 120 in the firearm mounting mode (as shown in FIGS. 3-8), the user might actuate the second actuator 195 as described above so that the end portion and shaft of the second actuator 195 moves along the third direction out of the fourth groove 115f, which allows the plate 115 to be rotated by the second predetermined angle with respect to the side mount 135, such that the end portion and the shaft of the second actuator 195 can move to the third groove 115e (with the shaft moving through the track groove between the third and fourth grooves 115e and 115f). When the shaft is in the third groove 115e, the second actuator 195 can be released (in some cases, allowing spring action to return the second actuator 195 to its rest position), resulting the in the shaft (and the end portion) moving along the fourth direction (which is opposite to the third direction), so that the end portion fits (and locks) within the third groove 115e). In some cases, a flat surface 115d of the plate 115 might abut against an angled stopping surface 105a of the side mount 135 when the end portion is in the third groove 115e. rotate the plate back to its previous position, the second actuator 195 can be depressed and the plate 115 rotated in the opposite direction by the second predetermined angle with respect to the side mount 135, until the end portion and the shaft are in the fourth groove 115f, then the second actuator 195 can be released, with the end portion fitting with (and locking within) in the fourth groove 115f.

The various actuators and levers—i.e., the first actuator 185 that allows each leg to be rotated by the first predetermined angle (e.g., 90 degrees or the like) with respect to the corresponding plate 115; the second actuator 195 that allows each plate 115 to be rotated by the second predetermined angle (e.g., 45 degrees or the like with respect to the corresponding side mount 135 or main body 125 of yoke 105, independent of any rotation of the corresponding leg with respect to said plate 115; the leg actuators 190 that allows the inner legs 170 to telescopically extend or retract within the cylindrical cavity of the main leg 165; the tension-setting device (which comprises the connector 150 and the collar 155 with handle 155a, or the like) that allows the firearm mount 110 to be rotated about axis 145 with respect to the main body 125 of yoke 105 of the bipod 100 (i.e., that allows the firearm that is attached to the bipod to be rotated about axis 145 with respect to the bipod 100; etc.—are designed to be actuated by a user with the use of a single hand of the user (in some cases, while the user is in a prone position with one hand on the grip).

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

What is claimed is:
1. A bipod for a firearm, comprising:
a yoke, comprising:
- a main body having a top surface, a bottom surface, and two sides, the two sides each having a side portion that lies along a side plane that is orthogonal to and intersects with each of a top plane along which a topmost portion of the top surface lies and a bottom plane along with a bottommost portion of the bottom surface lies, the top plane being parallel with the bottom plane;
- a cylindrical cavity through a space within the main body, a perimeter of the space being defined by connection of the top surface and the bottom surface by the two sides, the cylindrical cavity having a central axis, wherein the central axis does not intersect with any of the top plane, the bottom plane, or the side planes; and
- pair of side mounts each extending laterally from a corresponding one of the two sides of the main body, the pair of side mounts each having a mounting surface that is angled with respect to the corresponding one of the two sides such that the mounting surface lies along a plane that intersects with a corresponding side plane, but does not intersect with the central axis of the cylindrical cavity;

a firearm mount, comprising a cylinder that couples to the yoke through the cylindrical cavity, wherein the firearm mount, when the bipod is mounted on a firearm, is removably affixed to one of a fore stock or a handguard of the firearm via a mount, the central axis of the cylindrical cavity aligning with a central axis of the cylinder of the firearm mount and with a central axis of the mount when the firearm mount is coupled to the yoke and mounted within the mount;

a pair of legs, each comprising a head portion, a main leg, an inner leg, a leg spring, and a leg lever, the head portion being coupled to or formed from a proximal end of the main leg, the inner leg being fitted within a cylindrical cavity formed within the main leg, wherein the leg spring is disposed within an innermost portion of the cylindrical cavity near the proximal end of the main leg and maintains a repelling force between the cylindrical cavity of the main leg and a proximal end of the inner leg, the inner leg having a plurality of ring grooves formed along a circumference of the inner leg at predetermined intervals along a length of the inner leg, the leg lever being mounted on the main leg near a distal end thereof with a latch that fits within each of the plurality of ring grooves, wherein the latch, when the leg lever is actuated, moves away from a first ring groove of the plurality of ring grooves to fit within a second ring groove of the plurality of ring grooves when a spring of the leg lever causes the latch to move back toward the inner leg and when the leg spring causes the inner leg to move along the cylindrical cavity relative to the main leg;

a pair of plates, each comprising a first connector that connects to one of the pair of side mounts of the yoke and a second connector that connects to the head portion of one of the pair of legs;

a first actuator mounted to each leg, wherein the first actuator, when actuated, releases the corresponding leg to rotate with respect to the corresponding plate about a first axis that is orthogonal to a first plane by a first angle, and a second actuator mounted to each side mount, wherein the second actuator, when actuated, releases the corresponding plate to which the second actuator contacts to rotate with respect to the main body about a second axis that is orthogonal to a second plane by a second angle, independent of any rotation of the corresponding leg that is in contact with the corresponding plate relative to the corresponding plate effected by the first actuator, wherein the second plane is substantially parallel to the first plane.

2. The bipod of claim 1, wherein the first angle is 90 degrees.

3. The bipod of claim 1, wherein each plate further comprises a first groove, a second groove, and a curved side surface between the first groove and the second groove, the first actuator comprising a latch that fits within the first groove and that, when the first actuator is actuated, moves out of the first groove to travel along the curved side surface to fit within the second groove.

4. The bipod of claim 3, wherein each first actuator comprises a first actuator spring having a spring constant that prevents the first actuator from being actuated due to the weight of the firearm, while allowing a user to actuate the first actuator by applying a force against the leg on which the first actuator is mounted.

5. The bipod of claim 1, wherein the second angle is 45 degrees.

6. The bipod of claim 1, wherein each plate further comprises a third groove, a fourth groove, and a track groove between the third groove and the fourth groove, wherein the third groove, the fourth groove, and the track groove are disposed within a middle portion of the plate and extend through a thickness of the plate, wherein each second actuator comprises a shaft and an end portion extending from the shaft, wherein the end portion fits within the third groove and, when the second actuator is actuated, moves in a first direction parallel to the thickness of the plate out of the third groove to allow the shaft to move along the track groove to the fourth groove, with the end portion moving in a second direction opposite to the first direction to fit within the fourth groove.

7. The bipod of claim 1, further comprising:
a tension-setting device comprising a third connector and a collar with a handle, the third connector being removably affixed to the main body of the yoke, the collar wrapping around the circumference of a distal end of the cylinder of the firearm mount, wherein rotating the collar in a third direction by twisting the handle about the central axis of the cylinder in the third direction causes the cylinder of the firearm mount to press closer to the main body of the yoke thereby increasing resistance to rotation of the cylinder with respect to the main body, wherein rotating the collar in a fourth direction opposite to the third direction by twisting the handle about the central axis of the cylinder in the fourth direction causes the cylinder of the firearm mount to loosen contact with the main body of the yoke thereby decreasing resistance to rotation of the cylinder with respect to the main body.

8. The bipod of claim 7, wherein the main body comprises a through-hole groove on one of the top surface or the bottom surface of the main body, wherein the cylinder comprises a threaded hole, wherein, when a threaded end of a rod engages the threaded hole in the cylinder through the through-hole groove in the main body and when the collar is rotated in the fourth direction, the cylinder is free to rotate with respect to the main body about the central axis by a first range of angles that is delimited by a length of the through-hole groove.

9. The bipod of claim 1, wherein the firearm mount comprises one of a spigot-based firearm mount or a picatinny rail-based firearm mount.

10. A bipod for a firearm, comprising:
a main body comprising a pair of side mounts and a mounting connector that removably affixes to one of a fore stock or handguard of a firearm via a mount;
a pair of legs, each comprising a head portion and a main leg, the head portion being coupled to or formed from a proximal end of the main leg;
a pair of plates that each rotatably couples each of the pair of legs to one of the pair of side mounts of the main body;
a first actuator mounted to each leg, wherein the first actuator, when actuated, releases the corresponding leg to rotate with respect to the corresponding plate about a first axis that is orthogonal to a first plane by a first angle; and
a second actuator mounted to each side mount, wherein the second actuator, when actuated, releases the corresponding plate to rotate with respect to the main body about a second axis that is orthogonal to a second plane by a second angle, independent of any rotation of the corresponding leg relative to the corresponding plate effected by the first actuator, wherein the second plane is substantially parallel to the first plane.

11. The bipod of claim 10, wherein the first angle is 90 degrees.

12. The bipod of claim 10, wherein each plate further comprises a first groove, a second groove, and a curved side surface between the first groove and the second groove, the first actuator comprising a latch that fits within the first groove and that, when the first actuator is actuated, moves out of the first groove to travel along the curved side surface to fit within the second groove.

13. The bipod of claim 12, wherein each of the first groove and the second groove has a curved edge adjacent to the curved side surface that facilitates movement of the latch out of the corresponding groove.

14. The bipod of claim 12, wherein each first actuator comprises a first actuator spring having a spring constant that prevents the first actuator from being actuated due to the weight of the firearm, while allowing a user to actuate the first actuator by applying a force against the leg on which the first actuator is mounted.

15. The bipod of claim 10, wherein the second angle is 45 degrees.

16. The bipod of claim 10, wherein each plate further comprises a third groove, a fourth groove, and a track groove between the third groove and the fourth groove, wherein the third groove, the fourth groove, and the track groove are disposed within a middle portion of the plate and extend through a thickness of the plate, wherein each second actuator comprises a shaft and an end portion extending from the shaft, wherein the end portion fits within the third groove and, when the second actuator is actuated, moves in a first direction parallel to the thickness of the plate out of the third groove to allow the shaft to move along the track groove to the fourth groove, with the end portion moving in a second direction opposite to the first direction to fit within the fourth groove.

17. The bipod of claim 10, wherein each leg comprises a spring-loaded telescoping inner leg, a plurality of circumferential grooves, and a hand-actuated detente device comprising one or more contacts that engage with one of the plurality of circumferential grooves at a time.

* * * * *